Jan. 19, 1965  E. R. BARNETT ETAL  3,166,055
POWER UNIT
Filed Oct. 11, 1962  2 Sheets-Sheet 1
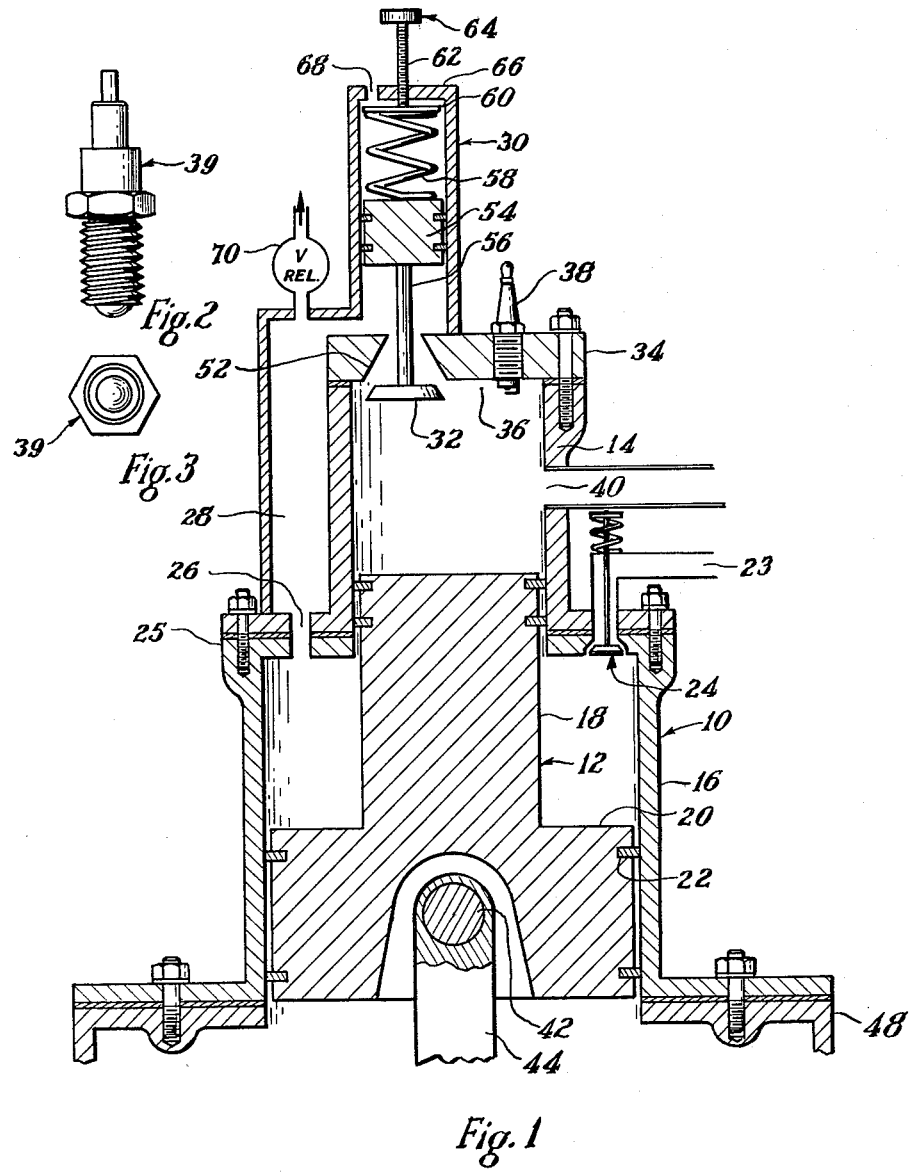
EUGENE R. BARNETT
and WILLARD L. BARNETT
INVENTORS
BY Robert A. Spray
ATTORNEY Jan. 19, 1965   E. R. BARNETT ETAL   3,166,055
POWER UNIT Filed Oct. 11, 1962   2 Sheets-Sheet 2

EUGENE R. BARNETT
and WILLARD L. BARNETT
INVENTORS

BY Robert A. Spray
ATTORNEY

United States Patent Office 3,166,055
Patented Jan. 19, 1965

3,166,055
POWER UNIT
Eugene R. Barnett and Willard L. Barnett, both of 6268 Windsor Drive, Indianapolis, Ind.
Filed Oct. 11, 1962, Ser. No. 229,805
11 Claims. (Cl. 123—71)

This invention relates to a power unit of internal combustion type.

Moore particularly, the present invention relates to a novel piston-type power unit of a type which attains certain advantages of both a four-cycle engine and a two-cycle engine, and has for its general object the provision of a novel engine having a supercharged power stroke for each cycle, and to attain other operational advantages detailed herein.

In carrying out the invention in an illustrative embodiment, there is provided a cylinder of a stepped configuration providing cylinder portions having different diameters, one portion providing a power cylinder and the other a supply cylinder; and a two-part, stepped-type, piston is movably carried within the cylinder, one part providing the power piston, and the other a supply piston. A fuel-air charge is admitted to the supply cylinder; and on upstroke, the supply piston forces the fuel-air charge along an exterior passage to the region of an over-head valve at the head-end of the power cylinder. The fuel-air enters the combustion chamber through this valve; and an adjustable means is provided to regulate the spring-bias of this valve to permit it to close at a desired timing to regulate total pre-ignition pressure. Ignition means explode the charge, thereby applying explosion pressure to the head of the power-portion of the piston for power during down-stroke. The stepped-nature of the piston and cylinder provides a means for super-charging of the fuel-air charge; the adjustable means provides for regulating the extent of total pre-ignition combustion-chamber pressure; and the efficiency is further improved by there being a power stroke for each cycle of the piston travel.

The above description is quite introductory and general, describing only the general stages of operation; and the above and other objects, features, concepts, and advantages which co-operate to provide the novel and advantageous overall invention will further appear from the following detailed description of an illustrative embodiment of the invention, reference being had to the accompanying somewhat diagrammatic drawings, in which:

FIG. 1 is a cross-sectional view of the upper portion of an engine embodying the present invention;

FIG. 2 is a detail view illustrating an alternative ignition means;

FIG. 3 is a bottom view of the ignition means shown in FIG. 2; and

Figure 4:
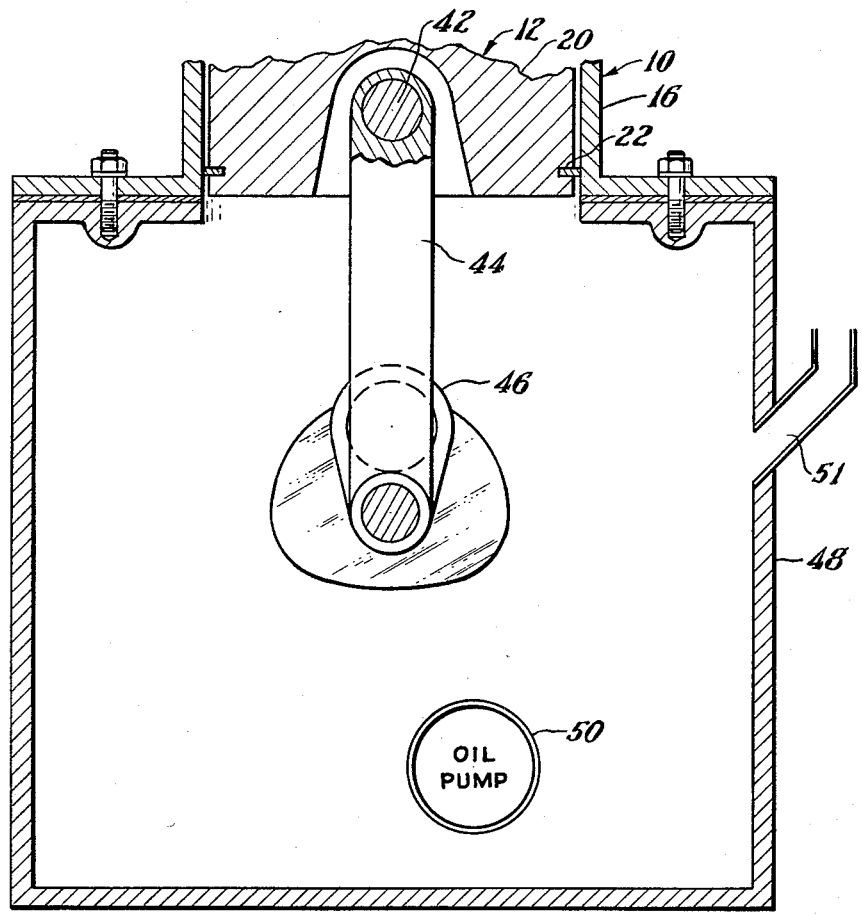
FIG. 4 is a cross-sectional view of the lower portion of the engine shown in FIG. 1, being a continuation of FIG. 1.

As shown in the drawings, an engine or power means according to the present invention generally comprises a cylinder 10 and a piston 12 reciprocable therein. The cylinder 10 is shown as having a stepped configuration, providing a relatively smaller-diameter upper portion 14 and a relatively larger-diameter lower portion 16, the cylinder-portions being adjacent and concentrically aligned but axially spaced. The piston 12 is likewise shown as of stepped configuration, providing a relatively smaller-diameter upper portion 18 and a relatively larger-diameter lower portion 20.

As will be set forth and described below, the upper cylinder 14 provides a "power" cylinder; and the lower cylinder 16 provides a "supply" cylinder.

Suitable piston rings 22 operatively seal the larger piston-portion 20 against the larger cylinder-portion 16, and the smaller piston-portion 18 against the smaller cylinder-portion 14, but permit reciprocation therealong.

Fuel-air charge, with lubricating oil also if desired, is admitted to the cylinder 10 from a fuel-air delivery tube 23 through a check-type valve 24 shown located in a cylinder head 25 at the upper end of the larger cylinder-portion 16; and during the downstroke of the piston 12, the movement of the larger piston-portion 20 away from the cylinder head 25 draws in a fuel-air charge through that valve 24 and into the larger cylinder-portion 16.

During upstroke of the piston 12, the larger piston-portion 20 forces the fuel-air charge out a port 26 in head 25 and into an exterior passageway 28, which is shown as running along the exterior of the smaller-diameter cylinder-portion 14; and at the head or upper end of the smaller cylinder-portion 14, the fuel-air charge of the passageway 28 enters a valve-housing 30 having a valve 32 for admitting fuel air to the combustion chamber provided by the smaller cylinder-portion 14.

(For simplicity of understanding, description of the details of scavenging, which also occurs during upstroke, and of details of the advantageous control-components in the area of valve-housing 30, are omitted until later in the operational description, the description now continuing after the fuel-air charge has passed by valve 32 in the cylinder head 34 of the combustion chamber 14, and the valve 32 has closed.)

With the fuel-air charge now in the combustion chamber and with the smaller piston-portion 18 having traveled to its upper limit (still removed from cylinder head 34 by clearance-space 36), the fuel-air charge is ignited by an ignition means 38 shown in FIG. 1 as a spark-plug carried in cylinder head 34, and in FIGS. 2 and 3 as a glow-plug 39.

The explosion force bears against the upper end of the smaller piston-portion 18, driving it downwardly to achieve the power stroke. Toward the end of the power stroke, the smaller piston-portion 18 reaches and uncovers an exhaust port 40, shown as provided in a wall of the smaller cylinder-portion 14; and combustion pressure is thereby exhausted.

During this power stroke, a new charge of fuel-air is entering through the valve 24 as described above, again charging the lower cylinder portion 16 for the next cycle.

Power from the piston 12 is utilized by providing the piston with a piston-pin 42, and a connecting rod 44 which extends between the piston-pin 42 and a suitable throw of a crankshaft 46, the crankshaft being suitably journaled in a housing 48 upon which the cylinder 10 is shown as bolted. An oil pump 50 is shown as located in the housing 48; and lubrication is achieved by pressure in this housing as in a four-cycle engine. The breather tube of housing 48 is illustrated by tube 51.

Scavenging is achieved during the beginning portion of the upstroke of the piston 12 (while the larger piston-portion 16 is beginning to force fuel-air to the area of the valve-housing 30 and valve 32, as mentioned above). During the piston upstroke, the smaller piston-portion 18 is moving upwardly in the smaller cylinder-portion 14, tending to compress the burnt fuel-air therein, and thus effects an exhausting thereof by forcing a significant amount of that burnt charge out the exhaust port 40.

Now, turning to advantageous details of the valve-housing 30 and operation of valve 32, it will be recalled that the fuel-air passageway 28 communicates with the valve-housing 30, the housing 30 providing a fuel-air entrance chamber above the seat 52 of valve 32.

Within the valve-housing 30, there is movably carried a control piston shown as a plunger 54 operatively connected with the valve-stem 56 of valve 32. This valve-housing plunger 54 is shown as biased downwardly (to valve-opening position) by a spring 58 which bottoms downwardly against the plunger 54 and at the other or upper end against a pressure disc 60. The position of disc 60, which governs the effective bias of spring 58, is itself governed by the stem 62 of an adjustment screw 64 shown as threadedly engaging the head 66 of valve-housing 30. The head 66 is shown as vented as by vent-port 68.

Accordingly, the fuel-air charge, emerging from passageway 28 to the control cylinder provided by valve-housing 30, is permitted to pass through valve 32 (to the explosion area of cylinder-portion 14), until the upward travel of smaller piston-portion 18 past exhaust port 40, together with the upward travel of larger piston-portion 20, causes pressure of fuel-air to increase to the value as determined by control screw 64. At this pressure, fuel-air pressure on valve-housing plunger 54 overcomes the bias of valve-spring 58, to close valve 32 against its valve seat 52.

Total pre-ignition compression pressure, accordingly, is regulated by the adjustment of valve-housing screw 64; for with relatively little spring bias, the valve 32 will be forced closed relatively early during piston upstroke, reducing total pressure thereafter to be obtained by the upward travel of piston 18 after valve-closure, by preventing the entrance of much of the fuel-air charge available to be admitted for further compression in the remainder of the compression stroke. And with adjustment of screw 64 to effect relatively more spring bias, the valve 32 will close relatively late during piston upstroke, having permitted relatively more fuel-air to pass valve 32 to the combustion area of cylinder-portion 14, thus relatively increasing total pressure effected by upward piston-travel after valve-closure. Such adjustment of compression pressure, effectively changing compression ratio, may be effected while the engine is operating.

Although this compression-adjustment, by varying the time of valve-closure, is illustrated as by a manual adjustment of screw 64 to regulate bias of spring 58, it is contemplated that other means for regulation of biasing means may be used; for example, with aircraft, biasing means could be altitude-responsive so as to delay valve-closure and thus admit more charge, to account for the lesser density of air at higher altitudes.

Primarily for use in diesel or other fuel-injection operations, there is provided in passage 28 an adjustable pressure relief valve 70. This valve 70 would be adjusted to relieve pressure from the compressing side of the supply piston 20, but at a value exceeding the pressure value which has closed valve 32, to reduce energy requirements in further compressing the unused portion of the air available in passage 28.

A power unit according to this illustrative embodiment provides a novel engine having many advantages, whether used singly or in multiple units, whether used with fuel-air mixture from an associated carburetor, or in a fuel-injection manner, and whether used in a single-acting or a double-acting arrangement.

Advantages of both a two-cycle engine and a four-cycle engine are obtained, obtaining a power stroke for each cycle, forced lubrication, forced breathing and scavenging, obtaining a nature of supercharging, and obtaining an adjustable regulation of pre-ignition combustion-chamber compression.

Accordingly, it will thus be seen from the foregoing description of the invention according to this illustrative embodiment, considered with the accompanying drawings, that the present invention provides a new and useful power means, having desired advantages and characteristics, and accomplishing its intended objects, including those hereinbefore pointed out and others which are inherent in the invention.

It will be understood that modifications and variations may be effected without departing from the scope of the novel concepts of the present invention; accordingly, the invention is not limited to the specific form or arrangement of parts herein described or shown.

Moreover, terms and expressions of the description and claims are to be broadly construed. For example, the term "fuel-air" is to be interpreted to refer to any component or components of the combustible charge, here contemplating both fuel-air mixtures as by a carburetor, or fuel injection types; "ignition means" is to be interpreted as including different types such as spark plugs, glow-plugs, and the like, or pressure-caused ignition, or automatic ignition by fuel injection; and terms like "head," "top," "upstroke," and the like are used to avoid repetition of alternatives, and it is not implied that the engine invention is limited to the upright vertical arrangement shown.

We claim as our invention:
1. An engine means, comprising:
 a stepped cylinder having concentrically aligned axially spaced portions of relatively smaller and relatively larger diameter;
 a stepped piston having concentrically aligned axially spaced portions of relatively smaller and relatively larger diameter, operatively mating with corresponding portions of the cylinder;
 the piston being movable within the cylinder between a top-dead-center position and a bottom-dead-center position;
 a head for said smaller-diameter cylinder-portion, and located thereon to provide clearance volume between said head and said smaller piston-portion when in top-dead-center position;
 means communicating fuel-air to said larger cylinder-portion above said larger piston-portion to admit fuel-air to said larger cylinder-portion during downstroke of said larger piston-portion;
 means providing an entrance chamber for fuel-air adjacent said head;
 means providing a passage leading from said larger cylinder-portion to communicate fuel-air therefrom, during upstroke of said larger piston-portion, to said entrance chamber;
 valve means for admitting fuel-air from said entrance chamber into said smaller cylinder-portion;
 biasing means for biasing said valve to valve-open position;
 said biasing means including a plunger one end of which is open to and operatively affected by pressure of fuel-air in said entrance chamber and in said smaller cylinder-portion when said valve is open;
 screw means for adjusting the bias of said biasing means and operative in conjunction with said pressures for regulating the time of closure of said valve and thus the total pre-ignition pressure within said smaller cylinder-portion; and
 the said smaller cylinder-portion being provided with exhaust port means operatively adjacent the lower end of said smaller cylinder-portion but above the upper limit of said smaller piston-portion when in bottom-dead-center position.

2. An engine means, comprising:
 a power cylinder having a power piston;
 a fuel-air supply cylinder having a supply piston;
 the said cylinders being adjacent and co-axially disposed;
 the power piston having a top-dead-center position in which it is generally disposed within said power cylinder and a bottom-dead-center position in which it is generally disposed in said supply cylinder;
 the power piston being reciprocably movable between said positions;
 the supply cylinder and the power piston providing an annular fuel-air chamber between the power cylinder and the supply piston and within the supply cylinder;
 means operatively connecting said pistons for coordinated movement;

means admitting fuel-air to said annular fuel-air chamber of the supply cylinder during the power stroke of said power piston;

means communicating said annular fuel-air supply chamber and said power cylinder;

the supply piston being operative to force fuel-air into said communicating means during the return stroke of said power piston;

a valve means regulating entrance of fuel-air from said communicating means to said power cylinder;

biasing means biasing said valve means to open position;

means actuated by fuel-air pressure to close said valve means against the bias of said biasing means; and exhaust means for said power cylinder, being operatively open toward the end of the power stroke of said power piston and remaining operatively open for a portion of the return stroke of said power piston to achieve forced exhausting of burnt fuel-air from said power cylinder.

3. An engine means, comprising:

a power cylinder having a power piston;

a fuel-air supply cylinder having a supply piston;

the said cylinders being adjacent and co-axially disposed;

the power piston having a top-dead-center position in which it is generally disposed within said power cylinder and a bottom-dead-center position in which it is generally disposed in said supply cylinder;

the power piston being reciprocably movable between said positions;

the supply cylinder and the power piston providing a fuel-air chamber between the power cylinder and the supply piston and within the supply cylinder;

means operatively connecting said pistons for co-ordinated movement;

means admitting fuel-air to said supply cylinder during the power stroke of said power piston;

means communicating said supply cylinder and said power cylinder;

the supply piston being operative to force fuel-air into said communicating means during the return stroke of said power piston;

a valve means regulating entrance of fuel-air from said communicating means to said power cylinder;

biasing means biasing said valve means to open position; and means actuated by fuel-air pressure to close said valve means against the bias of said biasing means.

4. An engine means, comprising:

a power cylinder having a power piston;

a fuel-air supply cylinder having a supply piston;

means for admitting fuel-air to said supply cylinder;

means communicating said supply cylinder and said power cylinder;

the supply piston being operative to force fuel-air into said communicating means;

a valve means regulating entrance of fuel-air from said communicating means to said power cylinder;

biasing means biasing said valve means to open position; and means actuated by fuel-air pressure to close said valve means against the biasing of said biasing means.

5. In an internal combustion engine having a power cylinder:

fuel-air control means for controlling the supply of fuel-air to said cylinder, comprising:

a valve means regulating flow of fuel into said cylinder;

biasing means biasing said valve means to open position;

means actuated by fuel-air pressure to close said valve means against the bias of said biasing means;

said biasing means including a spring;

said fuel-air-actuated means including a pressure-responsive plunger means against which said biasing spring operatively bears; and screw means adjusting the bias of said biasing spring.

6. In an internal combustion engine having a power cylinder:

fuel-air control means for controlling the supply of fuel-air to said cylinder, comprising:

a valve means regulating flow of fuel into said cylinder;

biasing means biasing said valve means to open position; and means actuated by fuel-air pressure to close said valve means against the bias of said biasing means;

said biasing means including a spring;

said fuel-air-actuated means including a pressure-responsive plunger means against which said biasing spring operatively bears opposing said fuel-air pressure.

7. In an internal combustion engine having a power cylinder, and a power piston, means for regulating pre-ignition total compression in the power cylinder, comprising:

a valve means;

means biasing said valve means to open position;

means for closing said valve means in response to a selected amount of return-stroke pressure in said power cylinder to limit the pressure of fuel-air charge in said power cylinder at valve-closure and thereby regulate total pre-ignition pressure developed by the remaining return-travel of said piston in said cylinder;

said valve-closing means including a control cylinder having a control piston exposed to power cylinder pressure while said valve is open, means operatively linking said control piston with said valve, and means biasing said control piston to valve-open position until the return-stroke pressure is sufficient when acting against control piston to overcome said bias and close said valve.

8. In an internal combustion engine having a power cylinder, and a power piston, means for regulating pre-ignition total compression in the power cylinder, comprising:

a valve means;

means biasing said valve means to open position; and means for closing said valve means in response to a selected amount of return-stroke pressure in said power cylinder to limit the pressure of fuel-air charge in said power cylinder at valve-closure and thereby regulate total pre-ignition pressure developed by the remaining return-travel of said piston in said cylinder.

9. In an internal combustion engine:

a power cylinder;

a power piston carried in the power cylinder and relatively movable therein to achieve power;

means admitting a fuel-air charge to the power cylinder;

variable-pressure means for delivering fuel-air in under pressure to said admitting means;

means exhausting burnt charge from the cylinder; and means for closing said admitting means at a selected stage of piston travel to regulate the pre-ignition pressure in said cylinder;

said closing means being responsive to and actuatable by a selected amount of pressure of said variable-pressure means.

10. In an internal combustion engine:

a power cylinder;

a power piston carried in the power cylinder and relatively movable therein to achieve power;

means admitting a fuel-air charge to the power cylinder;

means exhausting burnt charge from the cylinder; and means closing said admitting means at a selected stage of piston travel to regulate the pre-ignition pressure in said cylinder;

said closing means being responsive to and actuatable by the amount of pressure in said cylinder.

11. An internal engine comprising:
a power cylinder;
a power piston carried in the power cylinder and relatively movable therein to achieve power;
means providing a pressure chamber;
means supplying air under pressure to said chamber means;
means admitting a charge of air under pressure to said cylinder from said chamber means;
means closing said admitting means, including a movable member responsive to pressure in said chamber means to close said admitting means but having adjustable means biasing the said movable means against closure of the admitting means; and
pressure relief means operatively opening to said chamber means to relieve pressure therein after said admitting means is closed.

References Cited in the file of this patent

UNITED STATES PATENTS

| 856,790 | Micklewood et al. | June 11, 1907 |
| 1,082,004 | Anthony | Dec. 23, 1913 |
| 1,093,709 | Longard | Apr. 21, 1914 |
| 1,497,206 | Booten | June 10, 1924 |
| 1,525,956 | Sargent | Feb. 10, 1925 |
| 2,183,116 | Coates | Dec. 12, 1937 |

FOREIGN PATENTS

| 405,561 | France | Apr. 17, 1920 |
| 945,254 | France | Nov. 22, 1948 |
| 2,595 | Great Britain | Feb. 2, 1904 |
| 120,480 | Great Britain | Nov. 14, 1918 |